(12) United States Patent
Centner et al.

(10) Patent No.: US 7,279,541 B2
(45) Date of Patent: Oct. 9, 2007

(54) PRESSURE SENSITIVE ADHESIVES FOR PLASTICIZED PVC BACKINGS

(75) Inventors: Alexander Centner, Neustadt (DE); Karl-Heinz Schumacher, Neustadt (DE); Oliver Hartz, Mannheim (DE); Martin Jung, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/610,570

(22) Filed: Jul. 2, 2003

(65) Prior Publication Data

US 2004/0097638 A1 May 20, 2004

(30) Foreign Application Priority Data

Jul. 2, 2002 (DE) .................................. 102 29 733

(51) Int. Cl.
 C08F 220/10 (2006.01)

(52) U.S. Cl. .................... 526/317.1; 524/556; 524/561; 526/318.2; 526/328.5; 526/329.2; 526/329.5; 526/330; 526/331; 526/347; 428/500

(58) Field of Classification Search .............. 526/318.2, 526/328.5, 329.2, 329.5, 330, 331, 347; 524/556, 524/561; 428/500
See application file for complete search history.

(56) References Cited

U.S. PATENT DOCUMENTS

| 3,547,852 A | 12/1970 | Burke, Jr. |
| 3,787,259 A * | 1/1974 | Kleinfeld et al. .............. 156/78 |
| 3,983,297 A * | 9/1976 | Ono et al. ............ 428/355 AC |
| 4,371,659 A | 2/1983 | Druschke et al. |
| 4,424,298 A | 1/1984 | Penzel et al. |
| 4,456,726 A | 6/1984 | Siol et al. |
| 4,617,343 A | 10/1986 | Walker et al. |
| 4,619,964 A | 10/1986 | Kielbania et al. |
| 4,879,333 A | 11/1989 | Frazee |
| 5,183,841 A | 2/1993 | Bernard |
| 5,196,504 A | 3/1993 | Scholz et al. |
| 5,278,227 A | 1/1994 | Bernard |
| 5,322,731 A | 6/1994 | Callahan, Jr. et al. |
| 5,391,665 A | 2/1995 | Matsunaga et al. |
| 5,405,693 A | 4/1995 | Dittrich et al. |
| 5,430,092 A | 7/1995 | Aydin et al. |
| 5,461,103 A | 10/1995 | Bafford et al. |
| 5,474,638 A | 12/1995 | Kohlhammer et al. |
| 5,597,654 A | 1/1997 | Scholz et al. |
| 5,652,289 A | 7/1997 | Eisenhart et al. |
| 5,652,293 A | 7/1997 | Eisenhart et al. |
| 5,994,457 A | 11/1999 | Stanger et al. |
| 6,013,722 A | 1/2000 | Yang et al. |
| 6,020,062 A | 2/2000 | Questel et al. |
| 6,084,024 A | 7/2000 | Mao et al. |
| 6,087,425 A | 7/2000 | Eisenhart et al. |
| 6,107,382 A | 8/2000 | Williams et al. |
| 6,124,417 A | 9/2000 | Su |
| 6,136,903 A | 10/2000 | Su et al. |
| 6,147,165 A | 11/2000 | Lee et al. |
| 6,156,335 A | 12/2000 | Rovati et al. |
| 6,197,878 B1 | 3/2001 | Murray et al. |

(Continued)

FOREIGN PATENT DOCUMENTS

| DE | 3920935 | of 1991 |
| DE | 3920935 | 1/1991 |
| DE | 19649383 | 6/1998 |
| EP | 0 454 426 A2 | 10/1991 |
| EP | 0 590 886 | 4/1994 |
| FR | 1 560 639 | 3/1969 |
| GB | 2 070 037 | 9/1981 |
| JP | 60-244993 | 12/1985 |
| JP | 62-060214 | 3/1987 |
| JP | 62-151404 | 7/1987 |
| JP | 63-018654 | 1/1988 |
| JP | 01-141970 | 2/1989 |
| JP | 01-302213 | 12/1989 |
| JP | 05-302587 | 11/1993 |
| JP | 08-170529 | 7/1996 |
| JP | 09-214139 | 8/1997 |
| WO | WO 94/14891 | 7/1994 |
| WO | WO 98/44064 | 10/1998 |
| WO | 00/68335 | of 2000 |
| WO | 00/68335 | 11/2000 |
| ZA | 6705372 | 1/1968 |

OTHER PUBLICATIONS

H. Bartl, et al., "Methoden Der Organischen Chemie", (Houben–Weyl), Band XIV/1; Makromolekulare Stoffe, George Thieme Verlag, Stuttgart 1961, pp. 411–420.

H. Bartl, et al., "Methoden Der Organischen Chemie", (Houben–Weyl), Band XIV/1; Makromolekulare Stoffe, Georg Thieme Verlag, Stuttgart 1961, pp. 192–208.

English Abstract of Hongtao Zhang, "Preparation of Pressure–Sensitive Adhesives for Soft of Sheets of Polyurethane Foams," Faculty of Chemistry and Material Science, Hubel University, Wuhan, 430062.

*Primary Examiner*—Helen L. Pezzuto
(74) *Attorney, Agent, or Firm*—Oblon, Spivak, McClelland, Maier & Neustadt, P.C.

(57) ABSTRACT

The invention relates to a polymer synthesized
 from 0.5 to 30% by weight of vinyl acetate (a),
 from 0.1 to 10% by weight of monomer containing at least one acid or acid anhydride group (b),
 from 5 to 70% by weight of at least one monomer other than (a) and (b), having a solubility of more than 5 g/l water (21° C., 1 bar) and a glass transition temperature of less than 15° C. (c),
 from 0 to 20% by weight of a vinylaromatic monomer having a solubility of less than 5 g/l water (d),
 from 0 to 90% by weight of at least one $C_1$ to $C_{20}$ alkyl (meth)acrylate (e) other than (a) to (d), and
 from 0 to 40% by weight of at least one further monomer (f) other than (a) to (e).

15 Claims, No Drawings

U.S. PATENT DOCUMENTS

| | | |
|---|---|---|
| 6,214,931 B1 * | 4/2001 | Segers et al. .................. 525/34 |
| 6,242,552 B1 | 6/2001 | Su |
| 6,251,213 B1 | 6/2001 | Bartman et al. |
| 6,262,144 B1 | 7/2001 | Zhao et al. |
| 6,274,688 B1 | 8/2001 | Nakagawa et al. |
| 6,296,932 B1 | 10/2001 | Crandall et al. |
| 6,306,982 B1 | 10/2001 | Lee et al. |
| 6,376,094 B1 | 4/2002 | Dames et al. |
| 6,423,805 B1 | 7/2002 | Bacho et al. |
| 2001/0006628 A1 | 7/2001 | Govil et al. |
| 2001/0012551 A1 | 8/2001 | Peloquin et al. |
| 2001/0019721 A1 | 9/2001 | Brandt et al. |
| 2001/0019766 A1 | 9/2001 | Masuda et al. |
| 2001/0021452 A1 | 9/2001 | Kishioka et al. |
| 2001/0023264 A1 | 9/2001 | Yamamoto |
| 2001/0025077 A1 | 9/2001 | Scheuermann et al. |
| 2001/0025083 A1 | 9/2001 | Stark et al. |
| 2001/0027241 A1 | 10/2001 | Schuler et al. |
| 2001/0028959 A1 | 11/2001 | Centner et al. |

* cited by examiner

PRESSURE SENSITIVE ADHESIVES FOR PLASTICIZED PVC BACKINGS

The invention relates to a polymer synthesized
from 0.5 to 30% by weight of vinyl acetate (a),
from 0.1 to 10% by weight of monomer containing at least one acid or acid anhydride group (b),
from 5 to 70% by weight of at least one monomer other than (a) and (b), having a solubility of more than 5 g/l water (21° C., 1 bar) and a glass transition temperature of less than 15° C. (c),
from 0 to 20% by weight of a vinylaromatic monomer having a solubility of less than 5 g/l water (d),
from 0 to 90% by weight of at least one $C_1$ to $C_{20}$ alkyl (meth)acrylate (e) other than (a) to (d), and
from 0 to 40% by weight of at least one further monomer (f) other than (a) to (e).

The invention further relates to aqueous dispersions of the polymer and to adhesives, more particularly pressure sensitive adhesives, based on these polymers.

The invention relates in particular to the use of the pressure sensitive adhesives to join substrates of which at least one is made of plasticized PVC, and for producing self-adhesive articles with plasticized PVC as backing material.

For exterior applications it is common to use self-adhesive labels and tapes and also printed films comprising plasticized PVC as their backing material. Plasticized PVC films contain low molecular mass, phthalate-based plasticizers. One problem which may occur as a result of using these plasticizers is plasticizer migration from the film into the pressure sensitive adhesive (PSA). This detracts from adhesive performance. Not only the cohesion of the adhesive but also its adhesion to the surface to which the label or film is adhered are reduced, generally significantly, by the migration of the plasticizer into the adhesive.

In the exterior sector, the self-adhesive articles are also subject to the influence of moisture.

The action of water on the film of adhesive results in an unwanted white haze, also called blushing.

U.S. Pat. No. 3,547,852, EP-A 978 551, EP-A 454 426 and WO 98/44064 describe emulsion polymers, of various composition, as pressure sensitive adhesives for self-adhesive articles having backings of plasticized PVC.

It is an object of the present invention to improve the adhesive properties with backings comprising plasticized PVC and the attendant migration of plasticizers, and to reduce the blushing on moisture exposure.

We have found that this object is achieved by the polymer defined at the outset and its use as a pressure sensitive adhesive and also by self-adhesive articles produced using said adhesive and comprising plasticized PVC backing material.

The polymer of the invention is synthesized from free-radically polymerizable compounds (monomers) and is obtainable by free-radical polymerization of the monomers.

The amounts by weight below are always based on the polymer.

The polymer is synthesized
from 0.5 to 30% by weight of vinyl acetate (a),
from 0.1 to 10% by weight of monomer containing at least one acid or acid anhydride group (b),
from 5 to 70% by weight of at least one monomer other than (a) and (b), having a solubility of more than 5 g/l water (21° C., 1 bar) and a glass transition temperature of less than 15° C. (c),
from 0 to 20% by weight of a vinylaromatic monomer having a solubility of less than 5 g/l water (d),
from 0 to 90% by weight of at least one $C_1$ to $C_{20}$ alkyl (meth)acrylate (e) other than (a) to (d), and
from 0 to 40% by weight of at least one further monomer (f) other than (a) to (e).

The amount of monomer (a) is preferably from 1 to 20% by weight, with particular preference from 2 to 15% by weight, and with very particular preference from 5 to 15% by weight.

The amount of monomer (b) is preferably from 0.2 to 5% by weight, with particular preference from 1 to 5% by weight, and with very particular preference from 2 to 5% by weight.

The amount of monomer (c) is preferably from 10 to 60% by weight, with particular preference from 15 to 50% by weight, and with very particular preference from 20 to 40% by weight.

The amount of monomer (d) is preferably from 0 to 15% by weight, with particular preference from 0 to 10% by weight, and with very particular preference from 0 to 8% by weight.

In one particularly preferred embodiment, monomers (d) are present in the polymer, and in that case the amount is at least 0.1% by weight, in particular at least 0.5% by weight.

The amount of monomer (e) is preferably from 20 to 80% by weight, with particular preference from 30 to 80% by weight, and with very particular preference from 40 to 70% by weight.

The amount of monomer (f) is preferably from 0 to 30% by weight, with particular preference from 0 to 20% by weight, and with very particular preference from 0 to 10% by weight.

Monomers (f) are not necessary for achieving the advantageous properties, and may therefore also be dispensed with entirely.

Advantageous compositions of the polymers are, for example,
(a) from 1 to 20% by weight
(b) from 0.2 to 5% by weight
(c) from 10 to 60% by weight
(d) from 0 to 15% by weight
(e) from 20 to 80% by weight
(f) from 0 to 30% by weight
or in particular
(a) from 2 to 15% by weight
(b) from 1 to 5% by weight
(c) from 15 to 50% by weight
(d) from 0 to 10% by weight
(e) from 30 to 80% by weight
(f) from 0 to 20% by weight,
and with particular preference
(a) from 5 to 15% by weight
(b) from 2 to 5% by weight
(c) from 20 to 40% by weight
(d) from 0 to 8% by weight
(e) from 40 to 70% by weight
(f) from 0 to 10% by weight.

Examples of suitable monomers (b) include acrylic acid, methacrylic acid, itaconic acid, maleic acid, fumaric acid, and maleic anhydride.

Preference is given to acrylic or methacrylic acid.

The solubility of the monomers (c) is preferably greater than 10 g/l water. Monomers (c) have no acid or acid anhydride group.

The glass transition temperature of the monomers (c) is preferably less than 12° C.

Examples of suitable monomers (c) include ethyl acrylate and methyl acrylate.

The glass transition temperature is determined on the homopolymers by customary methods such as differential thermoanalysis or differential scanning calorimetry (see, for example, ASTM 3418/82, midpoint temperature).

Examples of suitable vinylaromatic compounds include vinyltoluene, α- and p-methylstyrene, α-butylstyrene, 4-n-butylstyrene, 4-n-decylstyrene, and—preferably—styrene.

Preference is given to styrene.

Monomers (e) are alkyl (meth)acrylates which do not come under (b) or (c); they are selected in particular from $C_4$–$C_{20}$ alkyl acrylates and $C_1$–$C_{20}$ alkyl methacrylates.

Preference is given to $C_4$–$C_8$ alkyl acrylates, especially n-butyl acrylate, or 2-ethylhexyl acrylate.

Further monomers other than (a) to (e) can be used as well. For the advantageous properties of the invention to be achieved, however, it is not necessary to use further monomers in addition.

In particular, further monomers (f) used do not include crosslinking monomers, e.g., those having 2 or more than 2 ethylenically unsaturated groups.

The additional use of crosslinkers, whether they be internal crosslinkers such as monomers f) or external crosslinkers added to the polymer for the purpose of crosslinking, is not necessary in the context of this invention.

The polymer is preferably in the form of an aqueous dispersion.

To this end, in one preferred embodiment the polymers are prepared by emulsion polymerization, and are therefore emulsion polymers. Emulsion polymerization leads directly to an aqueous dispersion of the polymer.

Alternatively, they can be prepared by solution polymerization with subsequent dispersion in water.

In the case of emulsion polymerization, use is made of ionic and/or nonionic emulsifiers and/or protective colloids and/or stabilizers as surface-active compounds.

A detailed description of suitable protective colloids can be found in Houben-Weyl, Methoden der organischen Chemie, Volume XIV/1, Makromolekulare Stoffe, Georg-Thieme-Verlag, Stuttgart, 1961, pp. 411 to 420. Suitable emulsifiers include anionic, cationic, and nonionic emulsifiers. As accompanying surface-active substances it is preferred to use exclusively emulsifiers, whose molecular weights, unlike those of the protective colloids, are normally below 2000 g/mol. Where mixtures of surface-active substances are used, the individual components must of course be compatible with one another, something which in case of doubt can be checked by means of a few preliminary tests. It is preferred to use anionic and nonionic emulsifiers as surface-active substances. Common accompanying emulsifiers are, for example, ethoxylated fatty alcohols (EO units: 3 to 50, alkyl: $C_8$ to $C_{36}$), ethoxylated mono-, di-, and tri-alkylphenols (EO units: 3 to 50, alkyl: $C_4$ to $C_9$), alkali metal salts of dialkyl esters of sulfosuccinic acid, and also alkali metal salts and ammonium salts of alkyl sulfates (alkyl: $C_8$ to $C_{12}$), of ethoxylated alkanols (EO units: 4 to 30, alkyl: $C_{12}$ to $C_{18}$), of ethoxylated alkylphenols (EO units: 3 to 50, alkyl: $C_4$ to $C_9$), of alkylsulfonic acids (alkyl: $C_{12}$ to $C_{18}$), and of alkylarylsulfonic acids (alkyl: $C_9$ to $C_{18}$).

Further suitable emulsifiers are compounds of the formula II

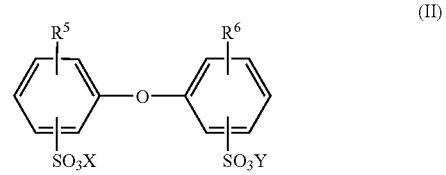

where $R^5$ and $R^6$ are hydrogen or $C_4$ to $C_{14}$ alkyl but are not simultaneously hydrogen, and X and Y can be alkali metal ions and/or ammonium ions. With preference, $R^5$ and $R^6$ are linear or branched alkyl radicals having from 6 to 18 carbon atoms or hydrogen and in particular have 6, 12 or 16 carbon atoms, $R^5$ and $R^6$ not both simultaneously being hydrogen. X and Y are preferably sodium, potassium or ammonium ions, sodium being particularly preferred. Particularly advantageous compounds II are those in which X and Y are sodium, $R^5$ is a branched alkyl radical of 12 carbon atoms, and $R^6$ is hydrogen or $R^5$. It is common to use technical-grade mixtures containing a fraction of from 50 to 90% by weight of the monoalkylated product, one example being Dowfax® 2A1 (trade mark of the Dow Chemical Company).

Suitable emulsifiers can also be found in Houben-Weyl, Methoden der organischen Chemie, Volume 14/1, Makromolekulare Stoffe, Georg Thieme Verlag, Stuttgart, 1961, pages 192 to 208.

Examples of emulsifier trade names are Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten E 3065, Disponil FES 77, Lutensol AT 18, Steinapol VSL, and Emulphor NPS 25.

The surface-active substance is commonly used in amounts of from 0.1 to 10% by weight, based on the monomers to be polymerized.

Water-soluble initiators for the emulsion polymerization are, for example, ammonium salts and alkali metal salts of peroxodisulfuric acid, e.g., sodium peroxodisulfate, hydrogen peroxide, or organic peroxides, e.g., tert-butyl hydroperoxide.

Also suitable are what are known as reduction-oxidation (redox) initiator systems.

The redox initiator systems are composed of at least one, usually inorganic reducing agent and one organic or inorganic oxidizing agent.

The oxidizing component comprises, for example, the emulsion polymerization initiators already mentioned above.

The reducing component comprises, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems may be used together with soluble metal compounds whose metallic component is able to exist in a plurality of valence states.

Examples of customary redox initiator systems include ascorbic acid/iron(II) sulfate/sodium peroxodisulfate, tert-butyl hydroperoxide/sodium disulfite, and tert-butyl hydroperoxide/Na hydroxymethanesulfinate. The individual components, the reducing component for example, may also be mixtures: for example, a mixture of the sodium salt of hydroxymethanesulfinic acid with sodium disulfite.

These compounds are mostly used in the form of aqueous solutions, the lower concentration being determined by the amount of water that is acceptable in the dispersion and the upper concentration by the solubility of the respective compound in water. The concentration is generally from 0.1 to 30% by weight, preferably from 0.5 to 20% by weight, with particular preference from 1.0 to 10% by weight, based on the solution.

The amount of the initiators is generally from 0.1 to 10% by weight, preferably from 0.5 to 5% by weight, based on the monomers to be polymerized. It is also possible for two or more different initiators to be used for the emulsion polymerization.

For the polymerization it is possible to use regulators, in amounts for example of from 0 to 0.8 part by weight per 100 parts by weight of the monomers to be polymerized. These regulators reduce the molar mass. Suitable examples include compounds containing a thiol group, such as tert-butyl mercaptan, thioglycolic acid ethylacrylic ester, mercaptoethynol, mercaptopropyltrimethoxysilane, and tert-dodecyl mercaptan.

The emulsion polymerization takes place in general at from 30 to 130° C., preferably from 50 to 90° C. The polymerization medium may be composed either of water alone or of mixtures of water and water-miscible liquids such as methanol. Preferably, only water is used. The emulsion polymerization may be conducted either as a batch operation or in the form of a feed process, including staged or gradient procedures. Preference is given to the feed process in which a portion of the polymerization mixture is introduced as an initial charge and heated to the polymerization temperature, the polymerization of this initial charge is begun, and then the remainder of the polymerization mixture is supplied to the polymerization zone, usually by way of two or more spatially separate feed streams, of which one or more contain the monomers in straight or emulsified form, this addition being made continuously, in stages or under a concentration gradient, and polymerization being maintained during said addition. It is also possible, in order, for example, to set the particle size more effectively, to include a polymer seed in the initial charge to the polymerization.

The manner in which the initiator is added to the polymerization vessel in the course of the free-radical aqueous emulsion polymerization is known to the skilled worker. It may either be included in its entirety in the initial charge to the polymerization vessel or else introduced, continuously or in stages, at the rate at which it is consumed in the course of the free-radical aqueous emulsion polymerization. In each specific case this will depend both on the chemical nature of the initiator system and on the polymerization temperature. It is preferred to include one portion in the initial charge and to supply the remainder to the polymerization zone at the rate at which it is consumed.

In order to remove the residual monomers, it is common to add initiator after the end of the actual emulsion polymerization as well, i.e., after a monomer conversion of at least 95%.

With the feed process, the individual components can be added to the reactor from the top, through the side, or from below, through the reactor floor.

In the case of emulsion polymerization, aqueous polymer dispersions with solids contents of generally from 15 to 75% by weight, preferably from 40 to 75% by weight, are obtained.

For a high reactor space/time yield, dispersions with as high as possible a solids content are preferred. In order to be able to achieve solids contents >60% by weight, a bimodal or polymodal particle size ought to be set, since otherwise the viscosity becomes too high and the dispersion can no longer be handled. Producing a new generation of particles can be done, for example, by adding seed (EP 81083), by adding excess quantities of emulsifier, or by adding miniemulsions. Another advantage associated with the low viscosity at high solids content is the improved coating behavior at high solids contents. One or more new generations of particles can be produced at any point in time. It is guided by the particle size distribution which is targeted for a low viscosity.

The polymer thus prepared is used preferably in the form of its aqueous dispersion.

The glass transition temperature of the polymer, or of the emulsion polymer, is preferably from −60 to 0° C., with particular preference from −60 to −10° C., and with very particular preference from −40 to −12° C.

The glass transition temperature can be determined by customary methods such as differential thermoanalysis or differential scanning calorimetry (see, for example, ASTM 3418/82, midpoint temperature).

The polymer or the dispersion of the polymer is suitable as an adhesive, particularly as a pressure sensitive adhesive (PSA).

The adhesives, or pressure sensitive adhesives, may be composed solely of the polymer or of the aqueous dispersion of the polymer.

The adhesives and PSAs may comprise further additives: fillers, colorants, flow control agents, thickeners or tackifiers (tackifying resins). Examples of tackifiers are natural resins, such as rosins and their derivatives formed by disproportionation or isomerization, polymerization, dimerization and/or hydrogenation. They may be present in their salt form (with, for example, monovalent or polyvalent counterions (cations)) or, preferably, in their esterified form. Alcohols used for the esterification may be monohydric or polyhydric. Examples are ethanol, ethanediol, diethylene glycol, triethylene glycol, 1,2,3-propanetriol, and pentaerythritol.

Also used are hydrocarbon resins, e.g., coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, and vinyltoluene.

Other compounds increasingly being used as tackifiers include polyacrylates which have a low molar weight. The polyacrylates preferably have a weight-average molecular weight $M_w$ of less than 30 000. With preference the polyacrylates are composed of at least 60% by weight, in particular at least 80% by weight, of $C_1$–$C_8$ alkyl (meth) acrylates.

Preferred tackifiers are natural or chemically modified rosins. Rosins are composed predominantly of abietic acid or its derivatives.

The amount by weight of tackifiers is preferably from 5 to 100 parts by weight, with particular preference from 10 to 50 parts by weight, per 100 parts by weight of polymer (solids/solids).

The adhesive or PSA is especially suitable for joining substrates, when at least one of the substrate surfaces to be joined is made of plasticized PVC. For example, the adhesive may be applied to a backing, made of paper or plastic, for example, and the backing thus coated (e.g., a label, adhesive tape or film) may be bonded to a substrate made of plasticized PVC (e.g., window profiles, etc.).

The adhesives or PSAs of the invention are especially suitable for producing self-adhesive articles, such as labels, adhesive tapes or adhesive films, e.g., protective films.

The self-adhesive articles are generally composed of a backing with a layer of the adhesive applied to one or both sides, preferably to one side.

The backing material may comprise, for example, paper, polymer films made of polyolefins or PVC, preferably PVC, and with particular preference plasticized PVC.

The mixture of the invention has particular advantages in the context of plasticized PVC backing material.

By plasticized PVC is meant polyvinyl chloride which includes plasticizers and has a reduced softening temperature. Examples of customary plasticizers include phthalates, epoxides, and adipates. The amount of plasticizers in the plasticized PVC is generally more than 10% by weight and in particular more than 20% by weight.

With plasticized PVC, plasticizers can migrate into the film of adhesive and significantly impair its properties. With the mixture of the invention, plasticizer migration has virtually no effect, if any at all, on the properties of the adhesive.

The present invention accordingly provides, in particular, self-adhesive articles comprising plasticized PVC backing material with, coated thereon, a film of adhesive comprising the above polymer.

To produce the film of adhesive on the backing material, the backing material can be coated conventionally.

The coated substrates obtained are used, for example, as self-adhesive articles, such as labels, adhesive tapes or films.

The self-adhesive articles comprising plasticized PVC backing material are particularly suitable for exterior applications.

In particular, printed self-adhesive films can be used in the exterior sector and can be adhered, for example, to advertizing boards or vehicles of all kinds.

The self-adhesive articles of the invention have good performance properties, in particular a good peel strength (adhesion) and shear strength (cohesion). The properties remain good even where the backing material is plasticized PVC.

Haziness in the film of adhesive as a result of moisture exposure (i.e., blushing) is observed barely if at all. Consequently, the film of adhesive is highly water resistant.

EXAMPLES

A) Preparation of the Polymer Dispersions

The polymer dispersions were prepared in accordance with the specification below for polymer dispersion C3 (see table):

| initial charge: | 150 g water |
| | 6.1 g seed polymer (polystyrene) |
| | 2.9 g feed stream 2 | feed stream 1 (total amount 819.4 g)

| 306.0 g | DI water |
| 13.3 g | Disponil FES77 (30% in water) |
| 5.0 g | acrylic acid |
| 50.0 g | styrene |
| 445.0 g | n-butyl acrylate |

(Disponil FES77: emulsifier; Na salt of an ethoxylated sulfuric monoester)

feed stream 2 (total amount 28.6 g)

28.6 g sodium persulfate, 7% in water

Feed streams 1 and 2 were added at a uniform rate over 3 hours at 90° C. Polymerization was then continued for 30 minutes.

The solids content of the polymer dispersion obtained was 49.8% by weight and its pH was 6.1.

Further dispersions were prepared accordingly.

The composition of the polymers is indicated in the table below.

| | Examples | | | |
| --- | --- | --- | --- | --- |
| | 1 | C1 | C2 | C3 |
| n-Butyl acrylate (BA) | 57.5 | 68 | 87 | 89 |
| Ethyl acrylate (EA) | 30 | 30 | | |
| Vinyl acetate (Vac) | 9 | | 9 | |
| Acrylic acid (AA) | 3.5 | 2 | 4 | 1 |
| Styrene (S) | | | | 10 |

The amounts are in % by weight.

B) Performance Tests

The polymer dispersions (following the addition of Latekoll as thickener) were coated onto plasticized PVC film (from Renolit) at a rate of 25 g/m$^2$ and the coated films were dried at 90° C. for 3 minutes.

Thereafter the peel strength (adhesion) and shear strength (cohesion) were measured.

The coated backing was cut into test strips 25 mm wide. For measurement of the shear strength, the test strips were bonded with an area of 25 mm$^2$ to a test panel made of V2A steel, rolled on once with a roller weighing 1 kg, stored for 10 minutes (under standard conditions, 50% relative humidity, 1 bar, 23° C.), and then exposed to a suspended weight of 1 kg (under standard conditions). The measure of the shear strength was the time taken for the weight to fall off; in each case, the average of 5 measurements was calculated.

For the determination of the peel strength (adhesion), a 2.5 cm wide test strip was adhered in each case to a steel test element and was rolled on once with a roller weighing 1 kg. After 20 minutes, it was clamped by one end into the upper jaws of a tension-elongation testing apparatus. The adhesive strip was peeled from the test area at an angle of 180° and a speed of 300 mm/min; in other words, the adhesive strip was bent over and peeled off parallel to the metal test panel, and the force required to do this was measured. The measure of the peel strength was the force in N/2.5 cm, which resulted as the average value from five measurements. The test was again carried out under standard conditions.

The tests of the shear strength and peel strength were repeated following storage under hot conditions. Storage of the test assemblies under hot conditions (3 days, 70° C.) is intended to simulate accelerated aging of the samples and so to bring about forced migration of the plasticizer from the PVC backing into the film of adhesive.

Water Resistance (Blushing)

The test strips were suspended in a water bath. The hazing of the film of adhesive was observed over time. The point in time at which marked hazing became evident was recorded. The longer the time, the better the water resistance.

| Peel strengths before hot storage [N/25 mm] | |
| --- | --- |
| 1: | 17.9 |
| C1: | 15.4 |
| C2: | 16 |
| C3: | 15.6 |

| Shear strengths before hot storage [h]: | |
| --- | --- |
| 1: | 60 |
| C1: | 13 |
| C2: | 100 |
| C3: | 39 |

| Peel strengths after hot storage [N/25 mm] | |
| --- | --- |
| 1: | 9.2 |
| C1: | 7.2 |
| C2: | 6.6 |
| C3: | 8.5 |

| Shear strengths after hot storage [h]: | |
| --- | --- |
| 1: | 50 |
| C1: | 3.4 |
| C2: | 8.9 |
| C3: | 16 |

| Blushing behavior: Significant hazing of the film on water storage after: | |
| --- | --- |
| 1: | 2 h |
| C1: | 1 h |
| C2: | 0.5 h |
| C3: | 20 min |

We claim:

1. A polymer, comprising polymerized units of:
   from 5 to 9% by weight of vinyl acetate monomer (a);
   from 2 to 3.5% by weight of a monomer (b) selected from the group consisting of acrylic acid, methacrylic acid, itaconic acid, maleic acid, fumaric acid, and maleic anhydride;
   from 30 to 60% by weight of at least one monomer (c) selected from the group consisting of ethlacrylate and methyacrylate;
   from 0 to 8% by weight of a vinylaromatic monomer (d) having a solubility of less than 5 g/l water;
   from 30 to 57.5% by weight of at least one $C_1$ to $C_{20}$ alkyl (meth)acrylate monomer (e) selected from the group consisting of n-butylacrylate and 2-ethylhexylacrylate; and
   from 0 to 10% by weight of at least one further monomer (f) other than monomers (a) to (e);
   wherein the polymer does not comprise crosslinking monomers.

2. The polymer as claimed in claim 1, wherein monomer (d) is present in an amount of at least 0.1% by weight.

3. An aqueous dispersion comprising the polymer as claimed in claim 1.

4. An adhesive comprising the polymer as claimed in claim 1.

5. A pressure sensitive adhesive comprising the polymer as claimed in claim 1.

6. An adhesive comprising the dispersion as claimed in claim 3.

7. A pressure sensitive adhesive comprising the dispersion as claimed in claim 3.

8. A process, comprising:
   applying a composition comprising the polymer as claimed in claim 1 to a plasticized PVC substrate, and
   subsequently joining the plasticized PVC substrate to a second substrate.

9. A process, comprising:
   applying a composition comprising the polymer as claimed in claim 1 to a first substrate; and
   subsequently joining the first substrate with a second substrate comprising a plasticized PVC.

10. The polymer as claimed in claim 1, comprising copolymerized units of n-butylacrylate, ethylacrylate, vinyl acetate, and acrylic acid.

11. The polymer as claimed in claim 1, wherein the polymer has a glass transition temperature of from −40 to −12° C.

12. The polymer as claimed in claim 1, wherein the polymer is obtained by polymerizing an aqueous emulsion of the monomers.

13. The polymer as claimed in claim 1, wherein when a film of the polymer is stored in water for two hours, significant hazing of the polymer is not observed.

14. The polymer as claimed in claim 10, wherein when a film of the polymer is stored in water for two hours, significant hozing of the polymer is not observed.

15. The polymer as claimed in claim 1, comprising:
    57.5% of copolymerized units of n-butylacrylate,
    30% of copolymerized units of ethylacrylate,
    9% of copolymerized units of vinyl acetate, and
    3.5% of copolymerized units of acrylic acid.

* * * * *